(12) United States Patent
Miller et al.

(10) Patent No.: US 7,852,886 B2
(45) Date of Patent: Dec. 14, 2010

(54) REDUCTION OF SURFACE HEATING EFFECTS IN NONLINEAR CRYSTALS FOR HIGH POWER FREQUENCY CONVERSION OF LASER LIGHT

(76) Inventors: R. J. Dwayne Miller, 21 Elmwood Avenue South, Port Credit, ON (CA) L5G 3J6; Shujie Lin, 264 Westmoreland Avenue, Toronto, ON (CA) M6H 3A5; Kresimir Franjic, 1545 Bathurst Street, Suite #404, Toronto, ON (CA) M5P 3H6

( * ) Notice: Subject to any disclaimer, the term of this patent is extended or adjusted under 35 U.S.C. 154(b) by 34 days.

(21) Appl. No.: 12/437,502

(22) Filed: May 7, 2009

(65) Prior Publication Data

US 2009/0238220 A1 Sep. 24, 2009

Related U.S. Application Data

(62) Division of application No. 11/739,652, filed on Apr. 24, 2007, now Pat. No. 7,542,490.

(60) Provisional application No. 60/794,521, filed on Apr. 25, 2006.

(51) Int. Cl.
*H01S 3/00* (2006.01)
(52) U.S. Cl. .............................. 372/21; 372/22; 372/32; 372/99
(58) Field of Classification Search ............. 372/21–22, 372/32
See application file for complete search history.

(56) References Cited

U.S. PATENT DOCUMENTS

| 5,680,412 | A | 10/1997 | DeMaria et al. |
| 5,796,766 | A | 8/1998 | Hargis et al. |
| 5,846,638 | A | 12/1998 | Meissner |
| 5,850,407 | A | 12/1998 | Grossman et al. |
| 6,002,695 | A | 12/1999 | Alfrey et al. |
| 6,381,255 | B1 | 4/2002 | Van Saarloos et al. |
| 6,393,038 | B1 * | 5/2002 | Raymond et al. ............. 372/22 |
| 2002/0012377 | A1 * | 1/2002 | Suganuma et al. ............ 372/98 |
| 2004/0130896 | A1 * | 7/2004 | Brown et al. ................ 362/259 |
| 2006/0114946 | A1 | 6/2006 | Sun et al. |
| 2008/0037598 | A1 | 2/2008 | Miller et al. |

OTHER PUBLICATIONS

Myatt et al., "Optical Fabrication: Optical Contacting Grows More Robust," *Laser Focus World*, vol. 42, Jan. 2006.

(Continued)

*Primary Examiner*—Dung T Nguyen
(74) *Attorney, Agent, or Firm*—Townsend and Townsend and Crew LLP (57) ABSTRACT

A device for generating a high power frequency converted laser beam includes a nonlinear optical crystal having an entrance surface and a curved surface. The nonlinear optical crystal is configured to receive at least one laser beam at the entrance surface and provide a frequency converted beam through a frequency conversion process. The device also includes an optical coating coupled to the curved surface. The reflectance of the optical coating is greater than 50% at a wavelength of the frequency converted beam. Additionally, the far field divergence angle of the frequency converted beam increases after reflection off the curved surface. The device further includes a heat sink in thermal contact with the optical coating.

20 Claims, 5 Drawing Sheets

OTHER PUBLICATIONS

Payne et al., "Diode Arrays, Crystals, and Thermal Management for Solid-State Lasers," *IEEE* Journal of Selected Topics in Quantum Electronics, vol. 3, No. 1, Feb. 1997, pp. 71-81.

International Search Report and Written Opinion of PCT Application No. PCT/CA2007/000693, dated Jul. 23, 2007, 10 pages total.

* cited by examiner

REDUCTION OF SURFACE HEATING EFFECTS IN NONLINEAR CRYSTALS FOR HIGH POWER FREQUENCY CONVERSION OF LASER LIGHT

CROSS-REFERENCES TO RELATED APPLICATIONS

The present application is a division of U.S. patent application Ser. No. 11/739,652, filed on Apr. 24, 2007, which claims benefit under 35 U.S.C. §119(e) of U.S. Provisional Patent Application No. 60/794,521, filed Apr. 25, 2006, the disclosures of which are hereby incorporated by reference in their entirety.

BACKGROUND OF THE INVENTION

The demand for high power lasers in different wavelengths is growing as new applications are found and the number of gain media in different wavelength regions remains limited. The primary mechanism used to change laser wavelengths to different spectral regions is the use of nonlinear crystals to convert the fundamental laser wavelength to new wavelengths. Examples of such systems include the conversion of the wavelength at 1064 nm from Nd:YAG lasers to a wavelength of 532 nm using nonlinear crystals such as Potassium Dihydrogen Phosphate (KDP), Barium Borate (BBO), Lithium Triborate (LBO), Bismuth Borate (BiBO), and Potassium Titanyl Phosphate (KTP). This light at 532 nm can be further converted to 355 nm by summing the resultant 532 nm radiation with the remaining laser fundamental at 1064 nm in another crystal to generate 355 nm. The 532 nm can also be converted to 266 nm by doubling in crystals such as BBO, Cesium Dihydrogenarsenate (CDA), Potassium Fluoroboratoberyllate (KBBF) and Cesium Lithium Borate (CLBO). The 266 nm can be converted by summing with the fundamental at 1064 nm to get to wavelengths as short as 213 nm.

In all of these processes, it is theoretically possible to attain conversion efficiencies of the fundamental laser wavelength to the desired wavelength range by as high as 100% for flat top spatial/temporal laser pulses. In practice, conversion efficiencies as high as 80-90% for second harmonic generation (SHG) and 30-40% for third harmonic generation (THG) to ultraviolet (UV) are attained using spatial-temporal shaped pulses and/or effective multi-pass operation of the nonlinear crystals.

The above wavelengths have found an extremely wide array of applications from laser machining (e.g., marking/engraving/cutting) of materials, to range finding, to laser surgery/dental applications. The different wavelengths have specific attributes related to the absorptivity of the light in the medium of interest that reflect the importance in changing wavelengths. In some cases, the desired wavelength is for increased transparency, such as in the case of range finding. In other cases, it is for higher absorption, as in the case of highly confining the energy for cutting materials through superheating and ablation. In all cases, the desired application benefits from higher laser power and frequency conversion to higher powers in the wavelength of interest as higher power either enables larger signals or faster processing.

Solid state lasers have been scaled to increasingly higher powers to attain significant brightness. For example, it is now possible now to produce continuous (CW) lasers with diffraction limited output at 1 KW, which corresponds to a focusable average power of more than $10^{11}$ W/cm$^2$. Despite the high power scaling capabilities of the fundamental laser source, it has not been possible to scale the nonlinear frequency conversion to take full advantage of the higher power inputs. Thus, there is a need in the art for methods and systems for reducing surface damage in nonlinear crystals used for efficient, high power frequency conversion of laser light.

SUMMARY OF THE INVENTION

Embodiments of the present invention relate to methods and apparatus that reduce surface heating effects in nonlinear crystals that are used for efficient high power frequency conversion of laser light.

A device for generating a frequency converted laser beam. The device includes a nonlinear crystal having a first end face and a second end face opposed to the first end face. The nonlinear crystal is configured to receive at least one input laser beam at the first end face and output a frequency converted beam at the second face. A beam waist of the at least one input laser beam is positioned between the first end face and the second end face during a frequency conversion process. The device also includes a second crystal having a first end face bonded to the second end face of the nonlinear crystal and a second end face opposed to the first end face. A beam diameter of the frequency converted beam at the first end face of the second crystal is less than a beam diameter of the frequency converted beam at the second end face of the second crystal.

According to another embodiment of the present invention, a device for generating a frequency converted laser beam is provided. The device includes a cell having an entrance window and an exit window and a nonlinear crystal having a first end face and a second end face opposing the first end face. The nonlinear crystal is disposed in the cell with the first end face a first predetermined distance from the entrance window and the second end face a second predetermined distance from the exit window. The nonlinear crystal is configured to receive at least one incident laser beam incident on the first end face. Additionally, the nonlinear crystal is oriented to provide for phase matching for a nonlinear optical conversion process operating on the at least one incident laser beam and producing a frequency converted laser beam. The device also includes a chemically inert fluid disposed in the cell. The chemically inert liquid is substantially transparent to the at least one incident laser beam and the frequency converted laser beam. A beam diameter associated with the frequency converted laser light beam at the exit window is greater than a beam diameter associated with the frequency converted laser light beam at the second end face.

According to yet another embodiment of the present invention, a device for generating a frequency converted laser beam is provided. The device includes a nonlinear crystal having first crystal face and a second crystal face opposed to the first crystal face. The nonlinear crystal is configured to receive at least one incident laser beam at the first crystal face and perform a frequency conversion process on the at least one incident laser beam to produce the frequency converted laser beam propagating in a propagation direction. The device also includes an optical material having a first material face coupled to the second crystal face and a second material face opposed to the first material face. The optical material is characterized by an index of refraction profile varying in a direction transverse to the propagation direction.

According to an alternative embodiment of the present invention, a device for generating a high power frequency converted laser beam is provided. The device includes a nonlinear optical crystal having an entrance surface and a curved surface. The nonlinear optical crystal is configured to receive at least one laser beam at the entrance surface and provide a frequency converted beam through a frequency conversion process. The device also includes an optical coating coupled to the curved surface. A reflectance of the optical coating is greater than 50% at a wavelength of the frequency converted beam. Additionally, a far field divergence angle of the frequency converted beam increases after reflection off the curved surface. The device further includes a heat sink in thermal contact with the optical coating.

According to another alternative embodiment of the present invention, a device for generating a frequency converted laser beam is provided. The device includes a nonlinear optical crystal having an entrance surface configured to receive at least one laser beam. The nonlinear optical crystal supports a frequency conversion process used to generate a frequency converted laser beam. The device also includes one or more second optical materials coupled to the nonlinear optical crystal and configured to provide a propagation path for the frequency converted laser beam. The at least the nonlinear optical crystal or the one or more second optical materials is characterized by a curved surface such that a far field divergence angle of the frequency converted laser beam increases after reflection from the curved surface. The device further includes a reflective coating optically coupled to the curved surface. A reflectance band of the reflective coating is associated with the frequency converted laser beam. Moreover, the device includes a heat sink in thermal contact with the curved surface.

Numerous benefits are provided by embodiments of the present invention. For example, some embodiments provide devices and methods that reduce or eliminate surface heating at one or more surfaces of a frequency conversion crystal and thus allow for stable, high power frequency conversion processes. Additionally, embodiments provide for beam expansion during propagation in order to reduce fluence levels at interfaces and corresponding crystal damage. In particular embodiments, Brewster surfaces and integrated diverging elements are utilized to provide for long-lived operation and low insertion losses. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

One issue that has prevented scaling of the nonlinear frequency conversion to higher powers is related to damage induced in the nonlinear crystal as the power is increased. As a result, the nonlinear frequency conversion efficiency is limited by damage to the nonlinear crystals. The fundamental limit is defined by the peak power density of the input laser beam that can cause damage by dielectric breakdown. Materials have been engineered that have both sufficiently high nonlinear coefficients and bulk peak power damage thresholds to attain high conversion and high power. Despite these gains, the maximum achievable output power into harmonics or other frequency conversion processes are still limited by surface damage. The intrinsic damage thresholds at surfaces are greatly reduced relative to the bulk due to poorer thermal conductivity at the surface. As a result, even small residual absorption leads to stress fracture at the unconfined surface layer. Thus, the ultimate power output for any given nonlinear crystal is determined, in part, by surface damage.

The damage arises from small residual absorption that leads to crystal heating, deformation, creation of defects, and further absorption that leads to optical damage and obscuring of the crystal's transparency and conversion ability. The damage is particularly a problem for crystals with AR coatings that are routinely used to prevent the Fresnel loss on the air/crystal interface. Optical coatings are in general prone to optical damage due to mismatch of the materials, defects, impurities, and the like. The surface of even uncoated crystals act as the weakest point in the overall power conversion process as the damage threshold of the surface is intrinsically smaller than the bulk crystal.

The most well known example of damage to nonlinear crystals is the damage of crystals used in high power UV generation for Q-switched laser systems with pulse durations on the order of 10-100 ns. There has been a current market identified for high power UV for cutting circuit boards, direct writing/repairing semiconductor wafers, drilling and marking on plastics or metals. However, it has been found that above 3 kW/cm$^2$, or 3-5 Watts of average power for typical focusing conditions, the crystals damage. The damage occurs below the peak power that would normally lead to crystal damage and the damage is confined primarily to the exit surface.

A few methods have been attempted/implemented in high power laser industry to solve the damage problem. The most common solution has been to use a crystal with a large cross section and translate the crystal in a pre-defined pattern to expose a fresh area when one area is damaged. The crystal is replaced after there is no longer enough useable area. Although this technique increases the useful lifetime of a single crystal, it does not address the fundamental aspects of the crystal damage and involves a bulky, complicated and costly mechanical motion mechanism.

Another approach is to cut the exit face of the THG crystal at the Brewster angle. The AR coating on the crystal surface is thus eliminated with the proper configuration of the beam polarization and the damage threshold of the surface is increased. The Brewster surface also serves as spatial beam separator, making it possible to alleviate the conventional dichroic mirrors for separation of UV beam from the incident beams. This method is useful in some regards but does not address the inherent damage mechanism at that surface.

The inventors have discovered the mechanisms of crystal damage. We identified at least four possible explanations for crystal damage. These possibilities include: 1) lower damage thresholds at the surface; 2) crystal strain at the surface due to outgassing from the crystal lattice and/or polishing effects; 3) increased rate of oxidation reactions at the surface due to heating and/or UV absorption by oxygen and impurities in the air; and 4) heating/transport problems unique to the surface.

By enclosing the crystal in a vacuum chamber in which oxygen could be removed and replaced with inert noble gases, it was discovered that the surface damage was not due to reactions. The introduction of oxygen did not significantly affect the laser induced surface damage rate from that observed in air. However, when the gas was completely removed so that the only thermal transport and cooling of the surface was through thermal diffusion through the crystal, the damage to the surface was immediate. By reintroducing various gases that provided even moderate cooling of the surface, the rate of laser damage was retarded. By flowing nitrogen ($N_2$) gas over the surface the rate of damage was further reduced and up to 3 Watt of UV was useable at typical focusing conditions giving greater than 3 kW/cm$^2$ of UV power at the exit surface.

Without being limited by any particular theory, the above studies illustrated that the damage mechanism is due to small impurities at the surface that lead to heating of the surface. Due to the fact that the surface has very poor thermal conductivity and can only lose heat primarily through collision exchange with gas molecules at the interface or thermal conduction through the crystal that has poor thermal conductivity, the surface temperature rises. This surface temperature increase causes crystal strain and darkening, further absorption, and run-away heating to damage. A solution utilized by embodiments of the present invention is to provide a means to reduce or avoid heat deposition at the interface to enable the highest possible scaling in average power for any given class of peak power laser and wavelength conversion range. Without limiting embodiments of the present invention, we believe it is the rate of heating per unit area that makes the most significant impact on surface heating. Thus, embodiments of the present invention expand the area of the frequency converted beam to spread the heat over a larger area and thereby minimize the rise in surface temperature before it encounters a surface.

According to an embodiment, a high thermal conductor/beam transport material is optically bonded to or placed in optical contact with the exit face of a nonlinear crystal to increase the output power at the converted wavelength for a range of conversion frequencies.

In the case of composite optical materials, two or more optical components can be bonded together. Such composite materials have been used for various optical functions. Examples are birefringent crystal based polarizers, beam-splitters, and zero-th order waveplates. There are several methods of bonding of two or more optical components (referred to herein as "optical bonding"). The most common method of optical bonding is epoxy bonding, in which the ends of the optical components are coated with a thin layer of epoxy, brought into contact, and then cured by heat or UV light. However, epoxy bonding cannot withstand high power laser radiation due to the intrinsically low damage threshold and low transmission at UV of the epoxy itself.

Epoxy-free (non-adhesive) components are generally desirable for high power optical applications. The basic method for non-adhesive optical bonding is "optical contact," in which two optical components are optically smoothed on at least one surface of each of the components and the two optically smooth surfaces are brought into close contact at room temperature. Under these extremely smooth conditions, the van der Waals and other inter-atomic and molecular forces are maximized and a bond is thus formed by atomic and molecular attractions between the surfaces. Variations of optical contact have also been developed to create extremely robust and mechanically strong bonds. Of special interest to embodiments of the present invention are optical contacting with chemical activation and diffusion bonding. In the chemically activated optical bonding (see. for example, C. Myatt, N. Traggis, and K. L. Dessau, *Laser Focus World*, Vol. 42, 95 (2006)), two optically polished components are treated chemically on the surfaces to create dangling bonds and then brought into optical contact. The part is then annealed at a temperature well below the melting temperatures to form covalent bonds between the atoms of each surface. The chemically activated bonding method can be used to form a robust, transparent, and large-area bond not only between similar but also dissimilar optical materials. The bonding can even be formed between coated surfaces.

In diffusion bonding, as disclosed in U.S. Pat. No. 5,846,638, two components are first optically contacted and then heat treated at an elevated temperature. This heating step allows the atoms at both surfaces to move to their most stable configuration in the interface region which upon cooling results in a much stronger bond than by optical contact alone. Diffusion bonding also has the ability to form a robust, transparent bond not only between similar but also dissimilar optical materials. Diffusion bonded laser rods have been used as gain materials for very high power lasers (see, for example, S. A. Payne et al, "Diode Arrays, Crystals, and Thermal Management for Solid-State Lasers", *IEEE J. of Selected Topics in Quantum Electronics*, Vol. 3, 71 (1997)).

Figure 1:
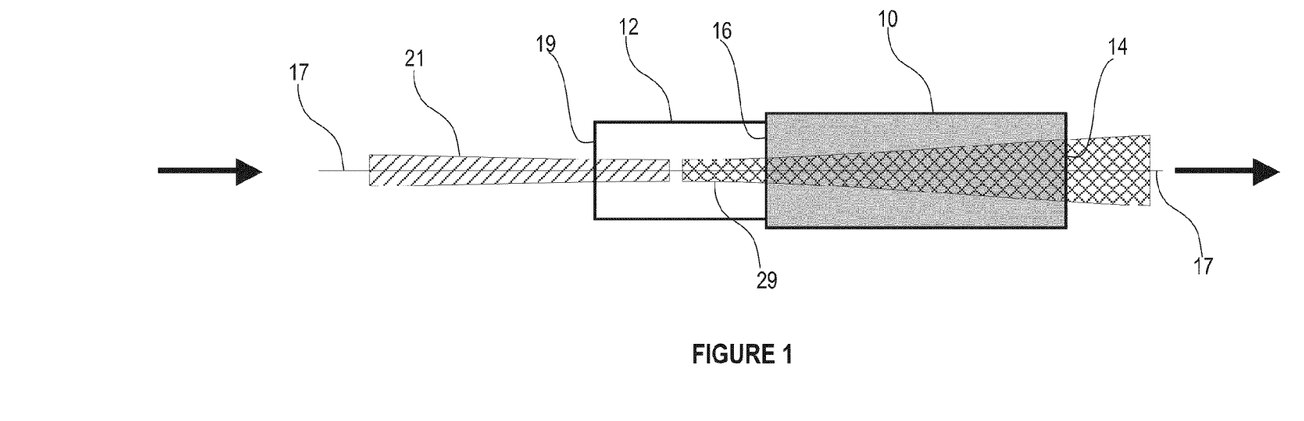
FIG. 1 shows an LBO crystal optically bonded to a sapphire crystal with high thermal conductivity according to an embodiment of the present invention.

Referring to FIG. 1, an embodiment of the present invention includes a device to produce a high power frequency converted laser beam that includes a sapphire crystal 10 (which has a thermal conductivity about one order of magnitude larger than those of most nonlinear optical crystals) that is optically bonded to an LBO crystal 12 for high power UV generation with the crystals being jointed at an interface 16. The LBO crystal 12 has an orientation that provides phase matching for the nonlinear optical conversion process, whereby at least one input laser beam 21 generates a frequency converted output laser beam 14.

The frequency conversion process is a function of the light intensity in the nonlinear optical crystal. Intensity is often defined as the ratio of the optical power to the beam area, which is related to the square of the beam diameter. Therefore, in some embodiments of the present invention, the one or more laser beams 21 are focused in the nonlinear optical crystal such that the focal point, often denominated as the beam waist, is located between end face 19 and interface 16. The dimensions of the beam waist depends on the application at hand and the optical power available. For example, for input laser beam peak power of less than 25 kW, the beam waist can be in the range of less than 1 μm to 5 mm; for input laser beam peak power much higher than 25 kW, the beam waist can reach 10 cm. The diameter of the frequency converted beam can be calculated using known equations. To a first approximation, the beam diameter is similar to the diameter of the input laser beam. Crystal 12 has end face 19 and the face at interface 16 which are optically flat, coated or uncoated, as are the end faces for crystal 10, showing end face 14 through which the high power frequency converted laser light exits the crystal.

The optical bonding is such that a uniform consistent bond is obtained over the entire radiated area to avoid voids that locally reduce the thermal conductivity and lead to thermal damage, which can occur at a solid/gas interface. In some embodiments, the interface 16 is characterized by an optical flatness of less than $\lambda/2$ and a scratch-dig characteristic better than 80/60. A solid/solid contact has much higher thermal conduction than a solid/gas interface, thereby eliminating the temperature rise at the interface and thus gives the same damage threshold as the bulk. The sapphire crystal itself is also subject to the same damage mechanism at its surface. The sapphire crystal 10 bonded to the LBO crystal 12 is long enough to transport the laser light beam far enough such that the resulting expanded beam produces little to no damage at the exit surface 14 of the optically bonded sapphire crystal 10. The exit face 14 may be uncoated or coated to reduce the Fresnel loss on the face. The nonlinear crystal 12 and the sapphire crystal 10 each have a longitudinal axis 17, which are coextensive and the incident laser beam 21 is directed into the end face 19 of the nonlinear crystal 12 normal to the plane of the end face 19 and the high powered laser beam produced in crystal 12 travels parallel to the longitudinal axis 17 of the two crystals to emerge from exit face 14.

It is noted that while the device shown in FIG. 1 is configured so that the (one or more) incident laser beam(s) are normal to the optically flat end face 17 of crystal 12, it will be understood by those skilled in the art that other configurations are included within the scope of the present invention. For example, the beam may be deviated slightly in order to achieve the optimum angular phase matching or/and to reduce the direct back-reflection. Thus, variations in angle deviation from normal incidence are included within some embodiments of the present invention. In some embodiments, the angle of deviation is less than 60° for either the input laser beam or the frequency converted laser beam. One of ordinary skill in the art would recognize many variations, modifications, and alternatives.

The preferred length of the sapphire crystal 10 depends on the laser beam parameters and surface damage threshold of the sapphire crystal 10 at the exit surface 14 at the particular frequency converted wavelength of light of the laser beam. Fresnel loss occurs on the interface 16 between two materials with difference in refractive index and can be expressed as well known in the art as $[(n1-n2)/(n1+n2)]^2$ where n1 and n2 are the indices of refraction of the materials. At a wavelength of 1064 nm, the Fresnel loss at the LBO/sapphire interface is about 0.3%, equivalent to the loss introduced by anti-reflection (AR) coated optics (e.g. lenses, waveplates, Q-Switch modules, and the like) and may be ignored or managed for most laser applications.

Embodiments of the present invention provide a novel scheme for coupling optical elements that are transparent at the wavelengths of interest and long enough to avoid excessive surface heating by transporting the beam to a surface where the laser beam area is large enough to avoid surface damage. It is desirable in applications involving high power UV generation to transport the laser beam far enough into the cooling material to allow the beam to expand. All materials absorb to a certain degree in the UV and experience the same problem as the nonlinear crystal used to generate the UV laser beam in the first place. It should be noted that the crystals, such as LBO, which are selected for this application are some of the most UV transparent materials known. This transparency is useful as even minute absorption leads to bulk heating and deleterious degradation of the laser beam as well as nonlinear power dependent losses and instabilities.

The much greater sensitivity of the surface to minute absorption and temperature increases exacerbates the problem. In addition, surface defects are generally impossible to avoid and this fundamentally leads to increased absorption of UV in the surface region. The phenomenon of UV generated surface damage has been found to be a universal problem. Even highly transparent materials such as LBO, fused silica, sapphire, calcium fluoride ($CaF_2$), which would normally be considered to be immune to absorption induced damage, are observed to experience surface damage at high power UV levels. This observation is a new phenomenon that has only been observed with the recent advance of high brightness UV laser beams. It is not sufficient to put on a sapphire end cap to cool the surface of the crystal used to generate the UV or to expect the UV damage threshold of the sapphire crystal to be usefully higher. Whatever material is chosen will experience the same mechanism of surface damage. Thus, simple diffusion bonded end caps described in S. A. Payne et al, "Diode Arrays, Crystals, and Thermal Management for Solid-State Lasers", *IEEE J. of Selected Topics in Quantum Electronics*, Vol. 3, 71 (1997) for surface cooling simply transfer the surface damage to the exit surface of the transparent capping layer.

While the embodiment illustrated in FIG. 1 has been described using an LBO crystal, it will be understood this is for purposes of illustration only and the nonlinear crystal may be any material that provides the desired optical conversion process. Examples of nonlinear crystals include, but are not limited to, Potassium Dihydrogen Phosphate (KDP), Barium Borate (BBO), Lithium Triborate (LBO), Bismuth Borate (BiBO), Potassium Titanyl Phosphate (KTP), Cesium Dihydrogenarsenate (CDA), Potassium Fluoroboratoberyllate (KBBF), Cesium Lithium Borate (CLBO), and Potassium Titanyl Arsenate (KTA).

The embodiment illustrated in FIG. 1 uses optical bonding to effectively transport the beam in a transparent body until the beam divergence creates a beam that is sufficiently large to avoid the optical damage by the high power frequency converted laser beam at the exit surface of the final medium. In some embodiments, the frequency converted beam has a divergence in the range between 0.1 mrad to 250 mrad. The beam expansion can be calculated by those skilled in the art given the input laser beam parameters and indices and lengths of the crystals. In some embodiments, the beam is expanded by a factor of greater than one. In a particular embodiment, the beam is expanded by a factor of the square root of two. This particular reference is given as the thermal transport at a surface discontinuity is one half that of the any given point in the bulk of the material assuming the surface is exposed to a vacuum. Decreasing the beam area by a factor of two compensates for this intrinsic difference. Other embodiments provide for a range of beam expansion from one (1) to one hundred (100).

In relation to embodiments of the present invention, beam properties including beam radius, beam width, beam waist, beam waist position, beam diameter, and beam divergence are utilized. Generally, definitions as provided according to the ISO are utilized herein. For example, the beam diameter may be defined as the distance between $1/e^2$ intensity points. Because this is not typically applicable to multimode beams including flat-top beams, other definitions are utilized as appropriate to the particular application. Thus, in an embodiment in which the beam diameter increases as a beam propagates from a first plane to a second plane, various definitions as appropriate to the particular beam spatial distribution may be utilized in a consistent manner.

Additionally, the concept of a far field divergence angle is utilized to describe beams utilized and produced in embodiments of the present invention. According to some embodiments, the far field divergence angle is defined with reference to a certain point on the beam propagation axis as the divergence angle that the beam would have if propagated from that point through free space to a point that is 100 km away.

Additionally, although sapphire is used as crystal 10 in the device illustrated in FIG. 1, it will be understood by those skilled in the art that the second crystal could be any other crystal exhibiting high thermal conductivity and which is substantially transparent at the wavelengths of interest. According to embodiments of the present invention, the term substantially transparent is used to denote materials that are characterized by low levels of optical absorption at a wavelength of interest. For example, in some embodiments, an optical intensity is reduced less than about 20% on passing through a substantially transparent material. The crystal 10 may therefore be any one of, but not limited to, sapphire, Yttrium Aluminum Garnet (YAG), Gadolinium Gallium Garnet (GGG), Gadolinium Vanadate ($GdVO_4$), Calcium Fluoride ($CaF_2$) and Cubic Zirconia crystals.

In other embodiments, to reduce or eliminate surface heating, phase matched crystals are optically bonded to non-phase matched crystals for concurrent beam transport and cooling. To completely or substantially eliminate contact problems associated with the method of optical contact or variations on this method, thermal conductor may be of the same material as the frequency conversion materials, but not contribute to the frequency conversion process. Using diffusion bonding as an example, it involves mechanically holding the two sections of crystal in place at an elevated temperature until the lattice atoms at the contact region rearrange and bond to each other thereby forming a bond between the two optical elements. In this process, lattice matching issues that are satisfied in order to avoid strain and defects that may lower the damage threshold and thus deteriorate the optical performance of the frequency conversion device.

Figure 2:
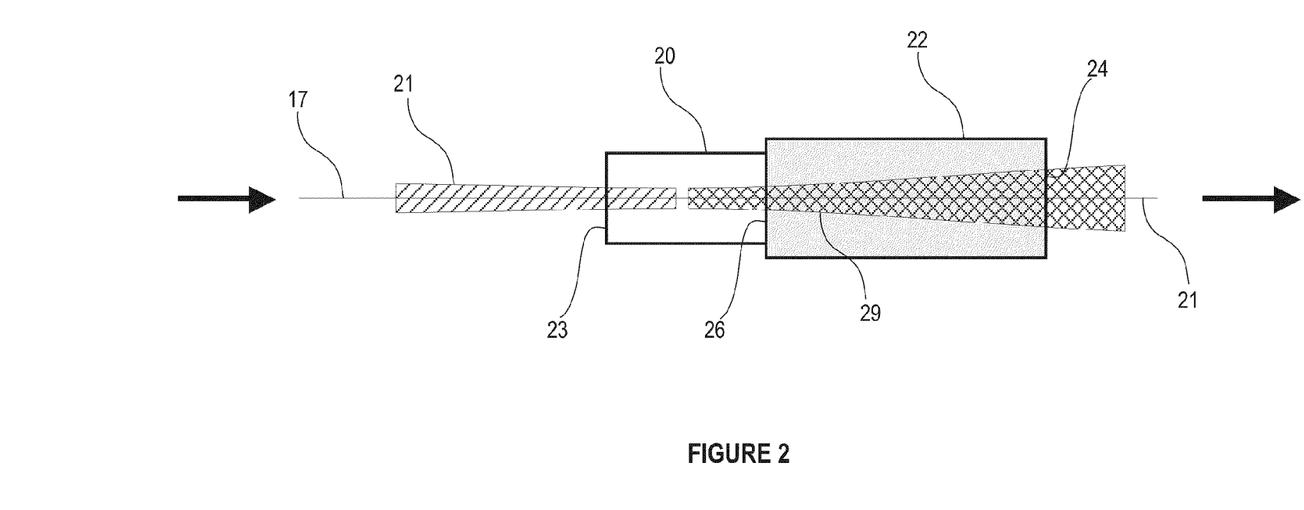
FIG. 2 shows a phase matching LBO crystal optically bonded to a second non-phase matching LBO crystal according to an embodiment of the present invention.

A solution to avoid lattice mismatch problems is to make both sections of the coupled optical device from the same crystal, such as illustrated in FIG. 2 where both sections 20 and 22 are made from LBO crystals. LBO crystal section 20 has an orientation that allows optimal phase matched frequency conversion in this crystal. LBO crystal section 22 should have an orientation deviated from phase matching to prevent further UV or other nonlinear conversion. In the embodiment illustrated in FIG. 2, the second LBO section 22 does not contribute to further frequency conversion as the primary crystal 20 will be chosen for an optimal length for highest frequency conversion. Lengths of the primary crystal 20 longer than the optimal frequency conversion length may lead to beam ellipticity, back conversion, and loss in laser brightness. The purpose of the second LBO section 22 is to transport the beam far enough so that the exit surface 24 is not exposed to the light beam until it has expanded to a large enough area to be below the damage threshold when it exits surface 24. Since the phase matching is highly sensitive to the orientation change of the crystal (e.g. the angular acceptance for THG of 1064 nm in LBO is less than 0.2 deg-cm) while other physical properties such as the effective refractive indices, the effective thermal expansion, and the effective lattice constants are much more tolerant of the same change, the orientation deviation in the LBO crystal section 22 may be made sufficiently small to suppress phase matching while at the same time retaining the near-perfect match in crystal lattices, thermal expansion, and refractive indices to the primary LBO crystal section 20. This leads to diminished mechanical stress and strong bonding on the interface 26. The Fresnel loss on the interface 26 is virtually nonexistent due to disappearance of the index step at the interface.

The two nonlinear crystals 20 and 22 each have a longitudinal axis 17 which is coextensive and the incident laser beam 21 is directed into the end face 23 of the nonlinear crystal 20 normal to the plane of the end face 23 and the high powered laser beam produced in crystal 20 travels parallel to the longitudinal axis 17 of the two crystals to emerge from exit face 24. However, as discussed with reference to the embodiment shown in FIG. 1 the incident laser beam(s) do not need to be incident exactly at normal incidence.

A novel feature provided by the embodiment illustrated in FIG. 2 is that the use of identical materials with a slight mismatch in crystal orientation substantially eliminates any residual problems associated with strain and index difference at the interface between the nonlinear crystals while providing near-perfect match of all the lattice properties.

For many crystals, it is not possible or practical to use other crystals to remove surface heat and transport the beam due to non-availability of the materials, high cost, or poor optical bonding qualities. The use of inert liquids that are transparent at the wavelengths of the input laser beam and the frequency converted beam can be used instead to accomplish similar effects. For example, referring to FIG. 3, in another embodiment of the present invention, one can use liquid chlorofluorocarbons (CFCs) or other liquids or gases which exhibit high transmittance in the UV down to about 240 nm. In some embodiments, the fluid is characterized by a density greater than 0.1 $g/cm^3$. In addition to being transparent and having reasonably high heat capacities, CFCs are also inert liquids, i.e., they do not react with the LBO crystal and exhibit virtually no photochemistry at the transparent wavelengths. The index of refraction of the CFC may be chosen to be index matched to that of the nonlinear crystal 30 in order to reduce the Fresnel loss at the interface between nonlinear crystal exit face 31 and the liquid. However, it is not necessary that they be perfectly matched as the major benefit is cooling of the nonlinear crystal exit face by having a high density fluid, compared to a solid/gas interface, to enable heat transport away from the nonlinear crystal exit face 31.

Figure 3:
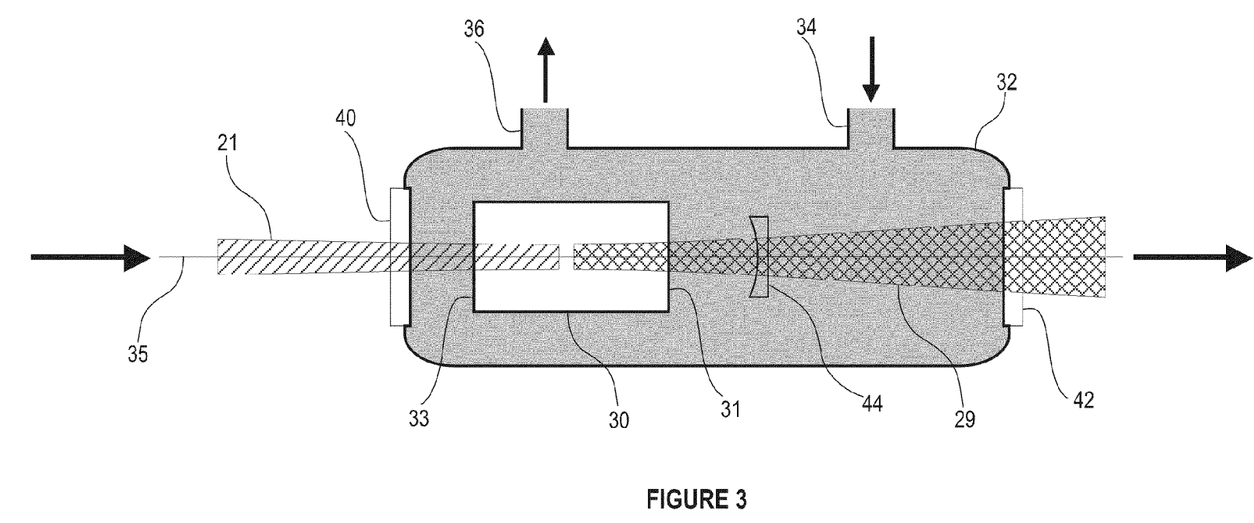
FIG. 3 shows an LBO crystal in an inert transparent liquid for heat removal according to an embodiment of the present invention.

As shown in FIG. 3, the LBO crystal 30, with the orientation optimized for efficient phase matched frequency conversion, is supported in a liquid circulation cell 32 having an inlet 34 and exit 36 through which the CFC liquid or other liquid or gas is circulated into and out of cell 32. Windows 40 and 42, which are transparent to the incoming and outgoing beams of light, respectively, are located at opposed ends of cell 32. An additional element, diverging lens 44, may be inserted between the crystal 30 and window 42 to ensure a rapid expansion of the light beam to avoid damage to window 42.

The nonlinear crystal 30 has a longitudinal axis 35, which is normal to the first and second opposed end faces 31 and 33, and the nonlinear crystal 30 is mounted in the cell 32 such that the incident laser beam(s) 21 are directed into the end face 33 of the nonlinear crystal 30. The high power UV laser light beam travels parallel to the longitudinal axis 35 of the nonlinear crystal 30. However, as discussed with respect to the embodiment of the device shown in FIG. 1 the incident laser beam(s) do not need to be incident exactly at normal incidence. The embodiment illustrated in FIG. 3 has the distinct advantage of unlimited scaling in the length of the beam transport section located between crystal exit face 31 and the cell exit window 42 with low cost material and is universally applicable to all nonlinear crystals with the correct choice of transparent inert liquids at the conversion wavelength of interest.

In some applications, they may be problems with the amount of material needed to transport the light beam far enough from the crystal face to get the intensity of the laser beam below the damage threshold of the crystals at the exit surface for the highest power operation for any given laser system. As the power is scaled higher, the beam diameter of the laser will be expanded and the confocal parameter of the laser beam will be correspondingly increased. This increase means that the required distance of propagation in the light transporting material (e.g., the optically bonded highly conducting solid 10 in FIG. 1, the optically bonded non-phase matched material 22 in FIG. 2, or the inert transparent liquid in FIG. 3) will increase quadratically with the beam diameter.

Figure 4:
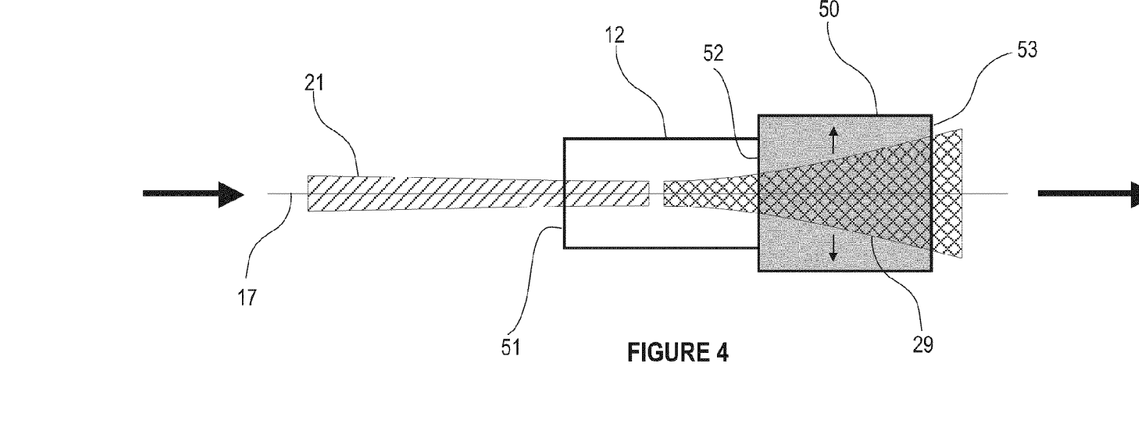
FIG. 4 shows an LBO crystal bonded to a gradient index component whose index profile is designed to increase the beam diameter by forming a diverging lens according to an embodiment of the present invention.

FIG. 4 shows an LBO crystal bonded to a gradient index component whose index profile is designed to increase the beam diameter by forming a diverging lens according to an embodiment of the present invention. To avoid the need for excessive amounts of material, an index of refraction profile can be introduced into the transport medium 50 attached to for example the LBO crystal 12 as shown in FIG. 4. Thus, embodiments utilize a gradient index beam expander that is optically bonded to the frequency conversion crystal. The average index of refraction of the optical material measured over the graded index profile is substantially equal (e.g., within 10% or within 5%) of the index of refraction of the nonlinear crystal in an embodiment of the present invention.

The index of refraction profile of the transport material 50 may be in the plane transverse to the axis of the transport medium 50 and designed based on the laser input parameters to rapidly increase the beam diameter by forming a diverging lens. This diverging lens can be achieved, for example, by using a transport material wherein the index of refraction profile increases as a function of a radial dimension. In the case of solid state contacts, this index of refraction profile can be accomplished by ion exchange, chemical-vapor-deposition (CVD), thermal diffusional glass preforming with gradient index layers, laser induced index changes, or the like. In some embodiments, gradient index beam expanders fabricated using techniques used for fabricating light waveguides in solids are employed. One of ordinary skill in the art would recognize many variations, modifications, and alternatives.

The transport medium 50 is an optical material which may be a crystal with the index profile written into it or it may be an amorphous glass-like material which provides for ease of fabrication. The average index of refraction of the profile may be designed to be close to that of LBO by proper selection of the substrate material in order to minimize the Fresnel power loss on the interface 52. In an embodiment that uses a fluid to provide cooling and beam transport, a diverging lens or a beam expander, coupled to the crystal by the inert transparent fluid can be introduced in the liquid cell. In this case, the index of refraction of the fluid is designed not to index match the beam expanding optics in order to enable the beam expansion while matching the crystal with some compromise in Fresnel losses at the various interfaces.

The nonlinear crystal 12 and the beam transport medium 50 each have a longitudinal axis 17 which are coextensive and the incident laser beam(s) 21 are directed into the end face 51 of the nonlinear crystal 12 normal to the end face 51. The high powered laser beam produced in crystal 12 travels parallel to the longitudinal axis 17 of the two materials to emerge from exit face 53 as an expanded laser beam. However, as discussed with respect to the embodiment shown in FIG. 1 the incident laser beam(s) do not need to be incident exactly at normal incidence.

In all of the above embodiments, the incident laser beams are normal or near normal to the output surfaces of thermal conductors. Referring to FIG. 3, the surfaces 14, 24 of thermal conductors or the window 42 of the liquid cell 32 may be uncoated or coated depending on the required power and the laser system design (e.g. intracavity or extracavity frequency conversions). In general, coatings (e.g., anti-reflection (AR) coatings) are used to reduce the Fresnel reflection loss at the surface (~4% for LBO and ~8% for sapphire at the wavelength of 355 nm). Such coatings provide for effective extraction of the generated photons and to prevent back-reflection, which may harm optical components in the laser system. While the reduction or elimination of surface heating and the larger beam spot on the output faces compared to a conventional frequency converter increases the damage threshold on the surface, the AR coated surfaces are generally more susceptible to optical damage than uncoated surfaces due to material mismatch, defects, or impurities in the coating layers. Thus, some embodiments of the present invention utilize a design with a surface that does not use AR coating and at the same time does not introduce excessive loss.

U.S. Pat. No. 5,850,407 describes a third harmonic generator with an uncoated Brewster exit face directly made on the frequency conversion crystal. As is well known in the art, the laser beam passes through a face at Brewster angle essentially without loss in power with a proper arrangement of the polarization (i.e., p-polarization), thus eliminating the need for an AR coating. Due to the dispersive nature of the Brewster surface, it also provides a means for wavelength separation without use of a coated dichroic mirror.

In an embodiment, the transport medium 50 is also a nonlinear crystal having a graded index profile. In this embodiment, the transport medium 50 is oriented at an angle deviated from a phase matching condition to thereby to reduce a magnitude of a frequency conversion process in the transport medium. One of ordinary skill in the art would recognize many variations, modifications, and alternatives.

Figure 5:
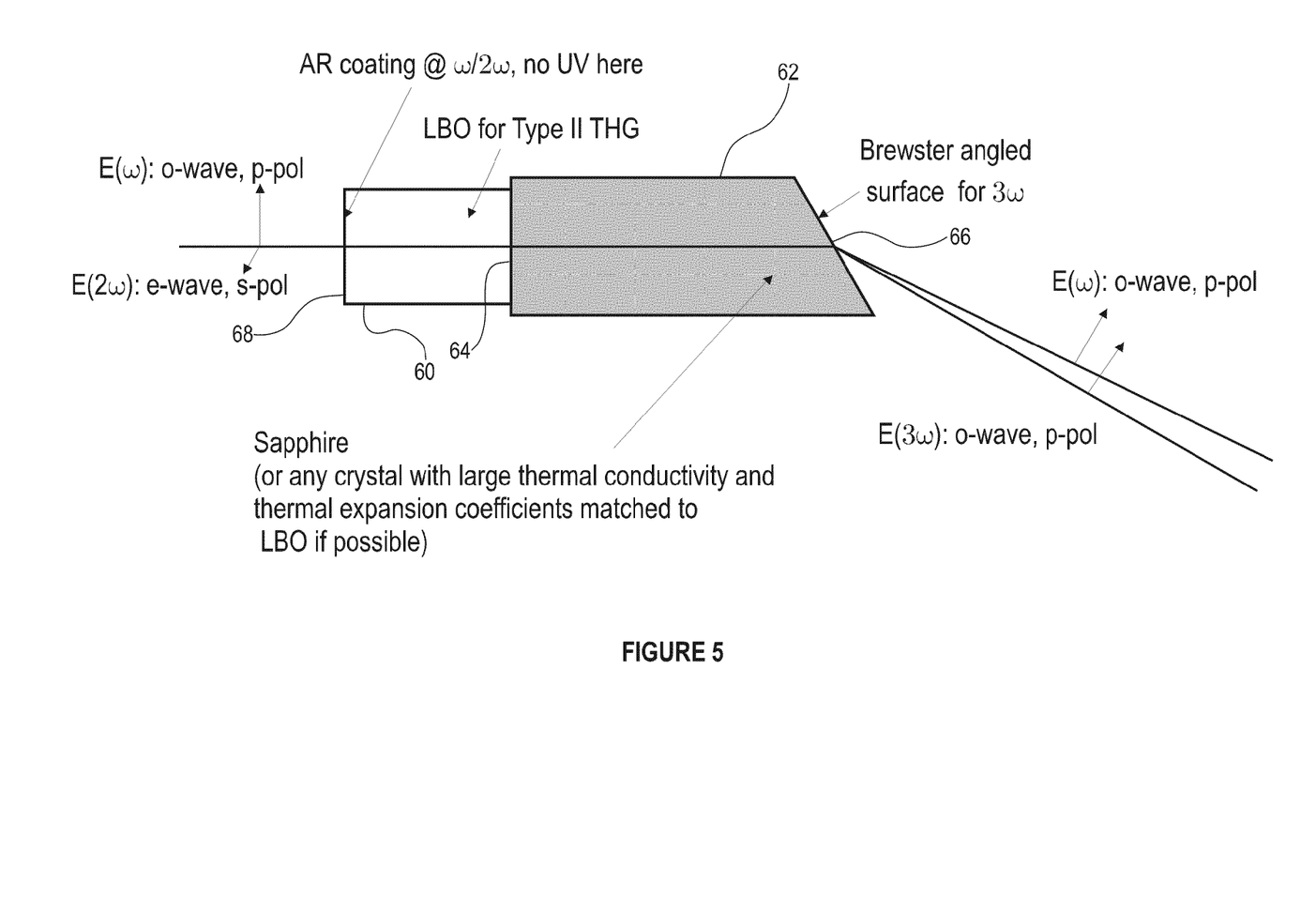
FIG. 5 illustrates an LBO crystal bonded to a Brewster angle cut thermal conductor (e.g. sapphire crystal or non-phase matching LBO) in which insertion loss on the exit face is eliminated.

In another embodiment of the present invention, the exit surface on thermal conductor is cut at the Brewster angle. FIG. 5 shows a design with the Type II phase matched THG generation in the nonlinear crystal LBO 60 as an example. By optically bonding a Brewster-cut thermal conductor 62 to the nonlinear crystal 60, advantages are provided including taking advantage of both enhancement of the damage threshold offered by the reduction or elimination of surface heating at the interface surface 64 and robustness of an uncoated surface 66. The obliqueness of Brewster surface 66 increases the effective beam area on the exit surface 66 by a factor of 1/sin(arctan n) (where n is the index of refraction of thermal conductor) due to deflection of light on the solid/air interface. With a sapphire crystal 62 as the conductor, for example, the expanding factor is close to 2. Transport of the light beam in thermally conducting material 62 also expands the beam size as discussed in the previous embodiments. The reduction of laser power per unit area on the exit surface 66 further reduces the possibility of damage on the uncoated exit surface 66. This unique combination of favorable features in surface heating reduction, increased beam spot size, and diminished insertion loss enables a frequency converter with a high damage threshold and reliability generally unachievable by other techniques.

The nonlinear crystal 60 has a longitudinal axis which is normal to the end face 68. The nonlinear crystal 60 is mounted such that the incident laser beam is directed into the first opposed end face of the nonlinear crystal 68 normal to end face 68, but as with the previous embodiments, it will be understood that the incident laser beam(s) do not need to be incident exactly at normal incidence.

The dispersive Brewster angle surface 66 on thermal conductor 62 can be used for spatial separation of the converted beam from the incident light beams. A distinct advantage of the Brewster angle on thermal conductor 62 rather than the nonlinear crystal 60 is that the spatial separation is now the sole property of thermal conductor and a large separation can be achieved with the selection of a thermal conductor that has a large dispersion, thus facilitating the design of the whole frequency conversion system.

As an example, the separation by a sapphire thermal conductor is 2° compared to 1° by an LBO crystal in the case of THG of 1064 nm. Also, this design may be used for intracavity frequency conversions as well as extracavity conversions. As is well known in the art the conversion efficiency in the case of intracavity application is highly sensitive to the insertion loss to the fundamental power of the nonlinear component. The excessive insertion loss results in high laser oscillating threshold and drastic reduction in the converted laser power. Utilizing the frequency converter designs described herein, there is no loss on the Brewster angle output surface 66. Accordingly, the input surface 68 may be AR coated as is done with conventional optics, since the fundamental wavelength incident on the crystal does not damage the surface. The nonlinear crystal/thermal conductor interface 64 may introduce a loss which can be expressed as $[(n1-n2)/(n1+n2)]^2$ where n1, and n2 are the indices of refraction for the nonlinear crystal and thermal conductor, respectively. This loss can be substantially eliminated when the thermal conductor has the same index as the frequency conversion crystal. As an example, the thermal conductor may be the same material as the frequency conversion crystal, but with a small deviation in orientation (as discussed above with the embodiment in FIG. 2). With a sapphire crystal bonded to LBO, the loss on interface 64 is ~0.3% at 1064 nm, which is equivalent to the loss by a typical AR coated element in the cavity and may be ignored or managed for most laser applications.

It is noted here that the use of a Brewster angle may introduce astigmatism. Beam reshaping and compensation may be used to remove astigmatism in the output light beam if so required. In particular, a matched Brewster cut thermal conductor placed in a sufficient distance may be used to compensate the astigmatism arising from the first thermal conductor.

As discussed throughout the present specification, accelerated beam expansion may be used to avoid the need for excessive amounts of material for a sufficient beam size at the exit face. In order for the UV beam to expand sufficiently while still propagating through the crystal, an additional optical element with negative optical power can be incorporated within the crystal. One way to do this, as described with reference to FIG. 4 is to create spatial profile of index of refraction in a way that the profile acts as a negative lens. Beam expansion can also be accelerated by forming at least one curved optical surface in the crystal with a high reflection coating for the UV light applied at that surface. The UV beam is positioned in the crystal to hit and reflect from the crystal curved surface at least once and the curvature of the curved surface is designed so that reflected UV beam gets expanded before it hits the exit surface. The reflection surface may contain its own defects that will be heated, but that surface can be cooled externally by putting it in contact with a material with high thermal conductivity (i.e., a heat sink) that can quickly spread the heat generated by these defects and hence decrease the problem with damage at that point.

Figure 6:
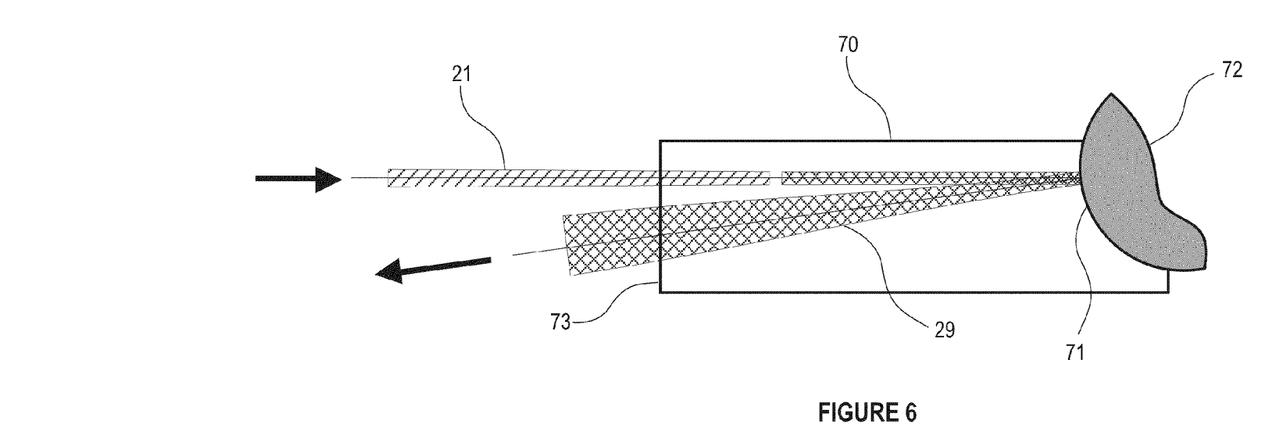
FIG. 6 shows an LBO crystal with one of its ends shaped as a spherically convex inward surface according to an embodiment of the present invention.

Referring to FIG. 6, in an embodiment, the curved surface is incorporated into the nonlinear crystal itself. Here, incident laser beam(s) 21 enters a nonlinear crystal 70 through a crystal optical surface 73 and a portion of their energy gets converted into an ultraviolet (UV) beam 29 through nonlinear optical conversion inside the nonlinear crystal. The nonlinear crystal has a convex (looking from the bulk of the crystal) spherical optical surface 71 that is formed in the side of the nonlinear crystal that stands against the propagation of the UV beam. As a result, the convex face reflects the UV beam into the crystal and accelerates beam expansion before the beam exits from the crystal.

Shaping spherical surfaces in optical materials is well known to those skilled in the art. The surface 71 is coated with a high reflection coating for the UV beam wavelength and preferably for the wavelengths contained in the laser beam 21 as well. For example, the coating reflectivity is greater than 50%. In other embodiments, the coating reflectivity is preferably greater than 99%. The radius and the position of the center of curvature of the spherical surface 71 is designed such that the UV beam gets reflected backwards at a small angle that allows angular separation of the incoming and outgoing beams outside the nonlinear crystal.

According to some embodiments, the design also provides that no UV conversion in the reflected beams is performed as the conversion process will be optimized for the incoming beam(s). Since the curved optical surface 71 is convex, the UV beam will get expanded during the propagation through the nonlinear crystal 70 before it hits the crystal surface 73 and leaves the crystal. Therefore, the power density at the UV beam exit surface will be reduced and the UV damage power threshold will be increased for the exit surface. On the other hand, the surface 71 will be hit by high intensity UV beam and heated, but that surface can be easily cooled by an external heat sink 72. The heat sink can be any material with good thermal conductivity and heat capacity that is put in good thermal contact. In some embodiments, the thermal contact between the heat sink and the surface to be cooled is referred to as being in thermal communication. Thus, physical contact between the heat sink and the surface may or may not be provided depending on the particular application. Thermally conductive layers may be interposed between the heat sink and the surface in other embodiments. One example for the heat sink is a metal coating on the top of the high reflection coating. Typical metal coatings have thermal conductivity two orders of magnitude larger than typical nonlinear crystals, so can quickly spread the heat across their surface. For very large UV powers, an additional heat sink fabricated from metal or other materials can be pressed or soldered to the metal coating for a more efficient heat removal.

The amount of the UV beam expansion depends on the propagation distance, so it is advantageous to increase the propagation distance by bonding the nonlinear crystal to a thermal conductor and incorporate a curved surface on thermal conductor. The additional optical material provides an additional path length for the UV beam expansion. Also, the thermal conductor is not a nonlinear optical crystal and the material may be chosen for ease of curved surface fabrication.

Figure 7:
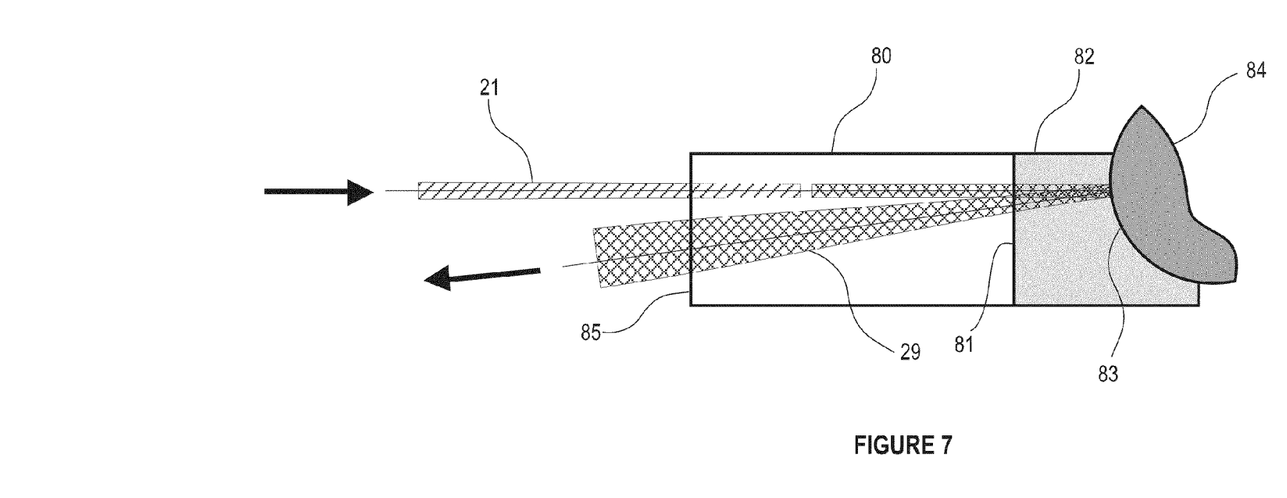
FIG. 7 illustrates an LBO crystal with a shaped surface according to another embodiment of the present invention.

An embodiment of the present invention incorporating a curved surface on a thermal conductor is illustrated in FIG. 7. The incident laser beam(s) 21 enter a nonlinear crystal 80 through a nonlinear crystal optical surface 85. UV beam 29 is generated by nonlinear optical conversion inside the nonlinear crystal. The side of the nonlinear crystal that is opposite to the surface 85 is optically bonded to a second optical material 82 with good optical and thermal properties through an interface 81. Thus, the embodiment illustrated in FIG. 7 employs some of the concepts illustrated in FIG. 6, but with the LBO crystal optically bonded to a thermal conductor along with a spherical surface incorporated directly in the thermal conductor.

The choice of the second optical material and ways of bonding to the nonlinear crystal should follow the same guidelines as the ones outlined throughout the present specification. The second optical material has a spherical surface 83 drilled in it, which is coated with a high reflection coating for the UV laser beam and is put in good thermal contact with a heat sink 84. The relative position of the spherical surface 83 with respect to the UV beam 29 is such that the UV beam gets reflected backwards and leaves the nonlinear crystal through the surface 85 with a small angle with respect to the incoming beams 21. Accordingly, an angular separation of the incoming and outcoming beams is provided in some embodiments. Generally, the design should also ensure no UV conversion occurs in the reflected beams as the conversion process will be optimized for the incoming beam(s).

Figure 8:
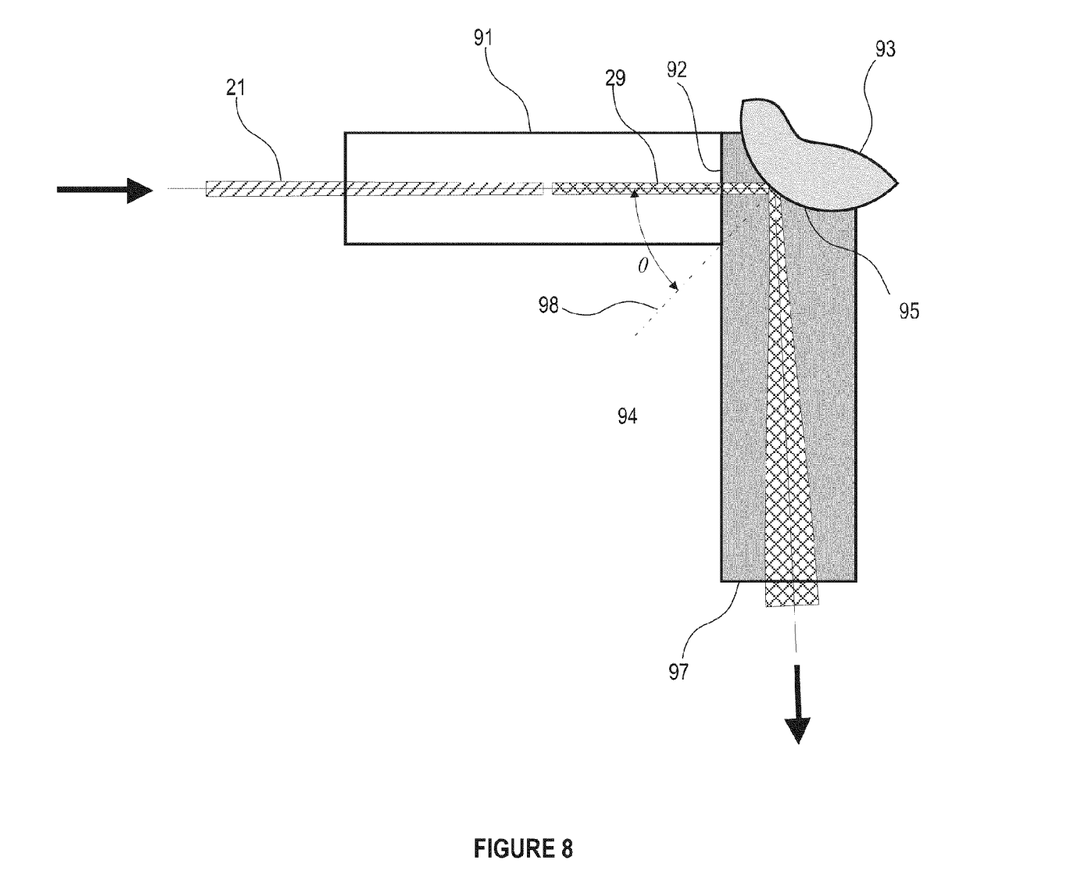
FIG. 8 illustrates an LBO crystal with a shaped surface according to yet another embodiment of the present invention.

As discussed before, minute absorption exists even in the most transparent nonlinear crystal and thus may heat up the nonlinear crystal. Therefore, it is advantageous to redirect the generated intense UV beam away from the nonlinear crystal (where the frequency conversion takes place) into thermal conductor and exit from thermal conductor. An embodiment that illustrates this idea is presented in FIG. 8. Laser beam(s) 21 enter a nonlinear crystal 91 and generate an UV beam 29 inside the nonlinear crystal through parametric conversion. The nonlinear crystal is optically bonded through an interface 92 to a thermal conductor 94 that has a spherical surface 95 drilled into it. The spherical surface is coated with high reflection coating for the UV beam and it is brought into close contact with a heat sink 93. As illustrated in FIG. 8, the beam reflected from the curved face propagates in thermal conductor.

Discussions in the previous embodiments related to designs of nonlinear crystal 80, thermal conductor 82, their interface 81, spherical surface 83, the high reflection coating on the surface 83, and the heat sink 84 also apply to corresponding elements 91, 94, 92, 95, and 93. In FIG. 8, the position of the spherical surface 95 with respect to the UV beam 29 is chosen so the UV beam gets reflected under a large angle of incidence relative to the normal of the curved surface. In an embodiment, the angle of incidence is approximately 45°. In other embodiments, the angle of incidence varies over a range of angles, for example, from about 1° to about 89°. In this way, the UV beam is directed away from the region with large frequency conversion and the problems of extra heating of the nonlinear crystal by residual UV absorption are reduced or eliminated. The length of the material 94 in the direction of propagation of the UV beam reflected of the surface 95 is long enough to allow sufficient expansion of the UV beam before it exits at surface 97 of the material 95.

It is noted that in embodiments illustrated in FIGS. 6-8, it may be advantageous to choose a reflection plane (the plane containing both the incident and reflected beams) at the spherical surfaces to be perpendicular to the polarization of the UV beam. In this way, the polarization of the UV beam will not be effected through the subsequent propagation through the nonlinear crystals or the attached optical material. This is useful in case specific polarization of the UV beam coming out the nonlinear crystal or the optical material is required. It is also noted that the use of a curved surface may introduce astigmatism. Beam reshaping and compensation may be used to remove astigmatism in the output light beam if so required. Also, it may be advantageous for the embodiments illustrated in FIGS. 6-8 to include an optical material that is brought in close optical contact with the nonlinear crystal or the attached optical material and having the Brewster cut surface that acts as the exit surface for the frequency converted beam. The advantages include further increases in the beam area and increasing angular separation between the useful frequency converted beam from other beams.

The above embodiments of the invention are relevant to all nonlinear conversion processes from infrared (IR) to visible and from the visible to UV spectral ranges, i.e. the issues are fundamental to all conversion processes and all laser classes. The excessive heating experienced at the beam exit surface as opposed to the bulk of the nonlinear crystal medium acts to limit the maximum power extractable from a nonlinear optical system. Thus, embodiments of the present invention enable the power extracted to reach the fundamental limit as defined by the damage threshold of the bulk of the crystal and not the surface. The overall effect can be gains of more than a factor of two in output power with little to no damage and, for many cases, more than an order of magnitude increase in achievable output powers.

While the present invention has been described and illustrated with respect to generating a high power UV laser beam using nonlinear optical conversion processes to convert a longer wavelength laser beam incident on a nonlinear crystal into the high power UV laser beam, those skilled in the art will appreciate that the present method also applies to all nonlinear frequency conversion in which there is surface heating and related damage. Merely by way of example, embodiments of the present invention are also applicable to high power infrared (IR) generation through optical parametric amplification (OPA) or difference frequency generation (DFG), in which surface heating will limit output powers in next generation intense IR laser systems.

Thus the high power laser light beam that is produced from the incident laser beam or beams entering the nonlinear crystal through optical parametric amplification (OPA) or difference frequency generation (DFG) (the produced beam) has a wavelength in the IR region of the light spectrum. Both OPA and DFG are two nonlinear optical processes which produce longer wavelengths in the infrared (IR) from typically two input beams with shorter wavelengths. The multiple input beams may also have different wavelengths.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A device for generating a high power frequency converted laser beam, the device comprising:
    a nonlinear optical crystal having an entrance surface and a curved surface, wherein the nonlinear optical crystal is configured to receive at least one laser beam at the entrance surface and provide a frequency converted beam through a frequency conversion process;
    an optical coating coupled to the curved surface, wherein a reflectance of the optical coating is greater than 50% at a wavelength of the frequency converted beam, wherein a far field divergence angle of the frequency converted beam increases after reflection off the curved surface; and
    a heat sink in thermal contact with the optical coating.

2. The device of claim 1 wherein the nonlinear crystal is selected from the group consisting of Potassium Dihydrogen Phosphate (KDP), Barium Borate (BBO), Lithium Triborate (LBO), Bismuth Borate (BiBO), Potassium Titanyl Phosphate (KTP), Cesium Dihydrogenarsenate (CDA), Potassium Fluoroboratoberyllate (KBBF), Cesium Lithium Borate (CLBO), and Potassium Titanyl Arsenate (KTA).

3. The device of claim 1 wherein the optical coating comprises at least a metal coating or a dielectric coating.

4. The device of claim 1 wherein the heat sink comprises a metal coating.

5. The device of claim 1 wherein the heat sink comprises a metal structure in thermal contact with a cooling fluid.

6. The device of claim 1 wherein the curved surface is convex inward with respect to a bulk region of the nonlinear optical crystal.

7. The device of claim 1 wherein a reflection plane of the frequency converted beam is substantially perpendicular to a polarization direction of the frequency converted beam during propagation through the nonlinear optical crystal.

8. The device of claim 1 further comprising a Brewster surface coupled to the nonlinear optical crystal.

9. The device of claim 1 wherein the heat sink comprises a fluid.

10. The device of claim 9 wherein the fluid comprises a flow of gas directed towards the curved surface.

11. A device for generating a frequency converted laser beam, the device comprising:
    a nonlinear optical crystal having an entrance surface and a curved surface, wherein the nonlinear optical crystal is configured to receive at least one laser beam at the entrance surface and provide a frequency-converted beam through a frequency conversion process;
    an optical coating coupled to the curved surface, wherein a reflectance of the optical coating is greater than 50% at a wavelength of the frequency-converted beam, and wherein a far field divergence angle of the frequency-converted beam increases after reflection off of the curved surface.

12. The device of claim 11 wherein the nonlinear crystal is selected from the group consisting of Potassium Dihydrogen Phosphate (KDP), Barium Borate (BBO), Lithium Triborate (LBO), Bismuth Borate (BiBO), Potassium Titanyl Phosphate (KTP), Cesium Dihydrogenarsenate (CDA), Potassium Fluoroboratoberyllate (KBBF), Cesium Lithium Borate (CLBO), and Potassium Titanyl Arsenate (KTA).

13. The device of claim 11 wherein the optical coating includes at least a metallic material.

14. The device of claim 11 wherein the optical coating includes at least a dielectric material.

15. The device of claim 11 wherein the curved surface is convex inward with respect to the bulk region of the nonlinear optical crystal.

16. The device of claim 11 wherein the optical axis of the frequency-converted beam after reflection off the curved surface is not coincident with the optical axis of the at least one laser beam incident upon the curved surface.

17. The device of claim 11 further comprising a heat sink in thermal contact with the optical coating.

18. The device of claim 17 wherein the heat sink comprises a metal structure.

19. The device of claim 17 wherein the heat sink comprises a fluid.

20. The device of claim 19 wherein the fluid comprises a flow of gas directed towards the curved surface.

* * * * *